(12) United States Patent
Brand et al.

(10) Patent No.: US 8,763,459 B2
(45) Date of Patent: Jul. 1, 2014

(54) VIBRATORY GYROSCOPE UTILIZING A FREQUENCY-BASED MEASUREMENT AND PROVIDING A FREQUENCY OUTPUT

(75) Inventors: Oliver Brand, Atlanta, GA (US); Stefan Schild, Mellingen (CH)

(73) Assignee: Georgia Tech Research Corporation, Atlanta, GA (US)

( * ) Notice: Subject to any disclaimer, the term of this patent is extended or adjusted under 35 U.S.C. 154(b) by 490 days.

(21) Appl. No.: 13/127,224

(22) PCT Filed: Nov. 3, 2009

(86) PCT No.: PCT/US2009/063124
§ 371 (c)(1),
(2), (4) Date: Aug. 24, 2011

(87) PCT Pub. No.: WO2010/051560
PCT Pub. Date: May 6, 2010

(65) Prior Publication Data
US 2012/0111120 A1    May 10, 2012

Related U.S. Application Data

(60) Provisional application No. 61/110,723, filed on Nov. 3, 2008.

(51) Int. Cl.
*G01C 19/56* (2012.01)
(52) U.S. Cl.
USPC ....................................... 73/504.12
(58) Field of Classification Search
USPC ......................... 73/504.12, 504.14
See application file for complete search history.

(56) References Cited

U.S. PATENT DOCUMENTS

| | | | |
|---|---|---|---|
| 5,608,351 A | 3/1997 | Ward | |
| 6,584,845 B1 | 7/2003 | Gutierrez et al. | |
| 6,651,499 B2 | 11/2003 | Fell et al. | |
| 6,845,669 B2 | 1/2005 | Acar et al. | |
| 7,036,372 B2 | 5/2006 | Chojnacki et al. | |
| 7,159,441 B2 | 1/2007 | Challoner et al. | |
| 8,443,665 B2 * | 5/2013 | Hsu ........................... | 73/504.12 |

OTHER PUBLICATIONS

International Search Report and Written Opinion dated Jan. 13, 2010 for related PCT Application No. PCT/US2009/063124.

* cited by examiner

*Primary Examiner* — John Chapman, Jr.
(74) *Attorney, Agent, or Firm* — Troutman Sanders LLP; Ryan A. Schneider; Daniel Sharpe

(57) ABSTRACT

A vibratory gyroscope utilizing a frequency-based measurement and providing a frequency output.

15 Claims, 5 Drawing Sheets

VIBRATORY GYROSCOPE UTILIZING A FREQUENCY-BASED MEASUREMENT AND PROVIDING A FREQUENCY OUTPUT

CROSS-REFERENCE TO RELATED APPLICATIONS

This application is a US National Stage of International Application No. PCT/US2009/063124, filed 3 Nov. 2009, which claims the benefit of U.S. Provisional Patent Application Ser. No. 61/110,723 filed 3 Nov. 2008, which application is hereby incorporated fully by reference.

BACKGROUND OF THE INVENTION

1. Field of the Invention

The present invention relates generally to rotation rate sensors, and more specifically to a vibratory gyroscope utilizing a frequency-based measurement, and thus providing a frequency-modulated output.

2. Description of the Related Art

The vast majority of conventional vibratory gyroscopes provide an output signal that is proportional to the amplitude of the sense mode vibration. In such conventional gyroscopes, a mechanical structure with two independent and perpendicular vibration modes is excited in one of the modes, the so-called drive mode. An applied external rotation rate generates a Coriolis force acting on the mechanical structure, which is proportional to the cross product of the microstructures velocity and the applied rotation rate. This Coriolis force induces a vibration in the second vibration mode, whereby the established vibration amplitude is proportional to the applied rotation rate. In other words, the Coriolis coupling causes an energy transfer from the drive to the sense oscillation.

Conventional gyroscopes include those disclosed in U.S. Pat. No. 7,284,430 wherein the gyroscope has an amplitude output, i.e. the measured vibration amplitude is proportional to the applied rotation rate. Yet, it would be beneficial to provide a gyroscope where the resonance frequency becomes a function of the applied rotation rate. U.S. Pat. No. 6,360,601 discloses a conventional gyroscope implementation where a signal amplitude (in this case a differential amplitude) is proportional to the applied rotation rate. While the disclosure introduces a feedback loop to null the sense amplitude, it would be beneficial to have the vibration frequency modulated by the applied rotation rate. U.S. Pat. No. 6,595,054 discloses a gyroscope providing a frequency output. However, the frequency output is solely a measure of the vibration amplitude's modulation by the applied rotation rate. Thus, this gyroscope is just yet another example of a gyroscope where the applied rotation rate modulates a vibration amplitude. It would be beneficial to provide a system wherein the applied rotation rate changes the resonance frequency of the primary and/or secondary oscillations operated in closed feedback loops.

Further, from A. A. Seshia, R. T. Howe, S. Montague, "An integrated microelectromechanical resonant output gyroscope," in *Proc. 2002 IEEE MEMS Conference (MEMS 2002)*, pp. 722-726, it is also known to provide a gyroscope with a frequency-output, wherein an amplitude-modulated gyroscope is coupled to two double-ended tuning forks (DETF) so that the sense mode vibration creates a (deflection-dependent) axial force acting on the DETF. Depending on the sense mode vibration amplitude, this coupling results in a frequency shift of the DETF. This design can be considered a gyroscope with an indirect frequency-output (using a resonant strain gauge as an amplitude sensor). U.S. Pat. No. 7,040,162 is based on two orthogonal modes of oscillation that have a slight frequency offset, so that the nodal plane rotates. This rotation rate becomes a function of the applied angular rate and is measured. It would be beneficial if the modes are matched and coupled so that the applied rotation rate induces a frequency change that can be measured. U.S. Pat. No. 7,159,461 discloses a conventional gyroscopes with an amplitude output. It uses feedback loops to ensure that the resonance frequency of the drive and sense modes are matched, and thus the sensitivity is maximized. The output is still an amplitude, and thus it would remain beneficial to provide a system where the oscillation frequency is modulated by the applied rotation rate.

It can be seen that there remains a need for a vibratory gyroscope with a frequency output, that can be considered a direct frequency-output, wherein the driving and the sensing mode are each operated in a closed-loop configuration with constant amplitude at their respective resonance frequencies and wherein the applied rotation rate affects the frequency of vibration. It is to the provision of such a system that the present invention is primarily directed.

BRIEF SUMMARY OF THE INVENTION

Briefly described, in an exemplary form, the present invention is a vibratory gyroscope with a frequency-modulated output. In contrast to the common amplitude-output gyroscopes, an applied rotation rate generates a Coriolis force, which acts as an additional spring force on the sense resonator, thus resulting in a measurable shift of the resonance frequency of the sense mode. Both drive mode and sense mode are operated in closed-loop configuration with appropriate controllers adjusting the drive mode frequency to that of the sense mode while maintaining a 90° phase shift between them.

The present invention has unique advantages over amplitude-output operation schemes: wherein (i) the scale factor is only determined by the ratio of the drive mode and sense mode vibration amplitude and can thus be actively controlled to increase the gyroscope's dynamic range; wherein (ii) the angle random walk is limited by the (excellent) short-term frequency stability of the (crystalline) resonator, which has been studied and optimized extensively for frequency/timing references; and wherein (iii) the bias drift can be improved by an intrinsic offset cancellation technique, enabling the measurement of the resonance frequency without the influence of the rotation rate.

Moreover, the general advantages of frequency-output sensors apply, namely the possibility of reading a frequency signal with high resolution and the ease of interfacing with digital signal processing.

Thus, in an exemplary embodiment, the present invention is a rotation rate sensor comprising at least one mass with two perpendicular vibration modes, capable of vibrating along an x axis at a resonant frequency $f_x$, and capable of vibrating along a y axis at a resonant frequency $f_y$, a first driving mechanism that imparts a sense mode vibration having frequency, amplitude, and phase to the mass along a sense mode axis, being one of the x or y axes, a first feedback signal for monitoring the sense mode vibration and making adjustments to the first driving mechanism, and an output signal having a default frequency, wherein upon rotation of the mass about an axis orthogonal to the x and y axes, the variation in the output signal from the default frequency is indicative of a rotation rate of the mass.

The rotation rate sensor can further comprise a second driving mechanism that imparts a drive mode vibration having frequency, amplitude, and phase to the mass along a drive mode axis, being the axis perpendicular to the sense mode axis. The rotation rate sensor can further comprise a second feedback signal for monitoring the drive mode vibration and making adjustments to the second driving mechanism. The frequency of the drive mode vibration and the frequency of the sense mode vibration can be approximately equal. The phase of the vibration along the drive mode axis and the phase of the vibration along the sense mode axis can be shifted approximately 90 degrees from one another.

The first and second driving mechanisms can each be operated in a closed-loop configuration, and with constant amplitude at their respective resonance frequencies. A constant ratio can be maintained between the amplitude of vibration along the sense mode axis and the amplitude of vibration along the drive mode axis. Furthermore, the amplitude of the frequency-modulated output signal can maintain a constant level.

In another exemplary embodiment, the present invention is a method of detecting rotation rate from changes in frequency comprising suspending a mass movable along or around one or more axes, vibrating the mass along or around a first of the one or more axes at an initial sense mode frequency by a sense mode signal, obtaining a change in the sense mode frequency from its initial sense mode frequency upon rotation of the mass about an axis that does not coincide with the first of the one or more axes, wherein the change of frequency of the sense mode signal from the initial sense mode frequency is indicative of a rotation rate of the mass.

In another exemplary embodiment, the present invention is a method of detecting rate of rotation from changes in frequency comprising vibrating a mass within a plane at an initial frequency of vibration by applying force to the mass, applying an additional force to the mass to restore the initial frequency of vibration to the mass, wherein the additional force is proportional to the rate of rotation of the mass, $\Omega$, and measuring a deviation, $\Delta\omega$ from the initial frequency of vibration due to a rotation of the mass about an axis orthogonal to the plane. The mass can be vibrated along the x axis at an amplitude $X_0$ and vibrated along the axis at an amplitude $Y_0$. The deviation $\Delta\omega$ can be approximately equal to $\Omega(X_0/Y_0)$.

In another exemplary embodiment, the present invention is a rotation rate sensor with a frequency output comprising at least one mass with two perpendicular vibration modes, capable of vibrating along an x axis at a resonant frequency $f_x$ and capable of vibrating along a y axis at a resonant frequency $f_y$, a first driving mechanism that imparts parts a drive mode vibration, amplitude and phase to the mass along a driving axis, being one of the x and y axes, a second driving mechanism that imparts a sense mode vibration, amplitude and phase of the mass along a sensing axis, being the axis perpendicular to the driving axis, and a rotation-rate dependent coupling between drive and sense mode vibration that changes the frequency of either the sense or the drive mode.

The rotation-rate dependent coupling can comprise a controller maintaining an approximately 90° phase shift between the sense and drive mode vibrations, and adjusting the resonant frequency $f_x$ to that of the resonant frequency $f_y$. Alternatively, the rotation rate coupling comprises a controller maintaining an approximately 90° phase shift between the sense and drive mode vibrations, and adjusting the resonant frequency $f_y$ to that of the resonant frequency $f_x$.

The first and second driving mechanisms can each be operated in a closed-loop configuration, and operated with constant amplitude at their respective resonance frequencies.

In another exemplary embodiment, the present invention is a rotation rate sensor with a frequency output comprising at least one mass with two perpendicular vibration modes, capable of vibrating along an x axis at a resonant frequency $f_x$, and capable of vibrating along a y axis at a resonant frequency $f_y$, a driving circuit that controls a drive mode vibration, amplitude and phase to the mass along a driving axis, being one of the x and y axes, a sensing circuit that controls a sense mode vibration, amplitude and phase of the mass along a sensing axis, being the axis perpendicular to the driving axis, and a rotation-rate dependent coupling between drive and sense mode vibration that changes the frequency of either the sense or the drive mode.

In another exemplary embodiment, the present invention is a method of sensing rotation rate comprising providing at least one mass with two perpendicular vibration modes, wherein the mass is capable of vibrating along an x axis at a resonant frequency $f_x$, and capable of vibrating along a y axis at a resonant frequency $f_y$, providing a drive mode vibration, amplitude and phase to the mass along a driving axis, being one of the x and y axes, sensing a sense mode vibration, amplitude and phase of the mass along a sensing axis, being the axis perpendicular to the driving axis, and phase shifting at approximately 90° the sense and drive mode vibrations. The method can further comprise adjusting the resonant frequency $f_x$ to that of the resonant frequency $f_y$, or alternatively, adjusting the resonant frequency $f_y$ to that of the resonant frequency $f_x$.

These and other objects, features, and advantages of the present invention will become more apparent upon reading the following specification in conjunction with the accompanying drawing figures.

DETAILED DESCRIPTION OF PREFERRED EMBODIMENTS

Figure 1:
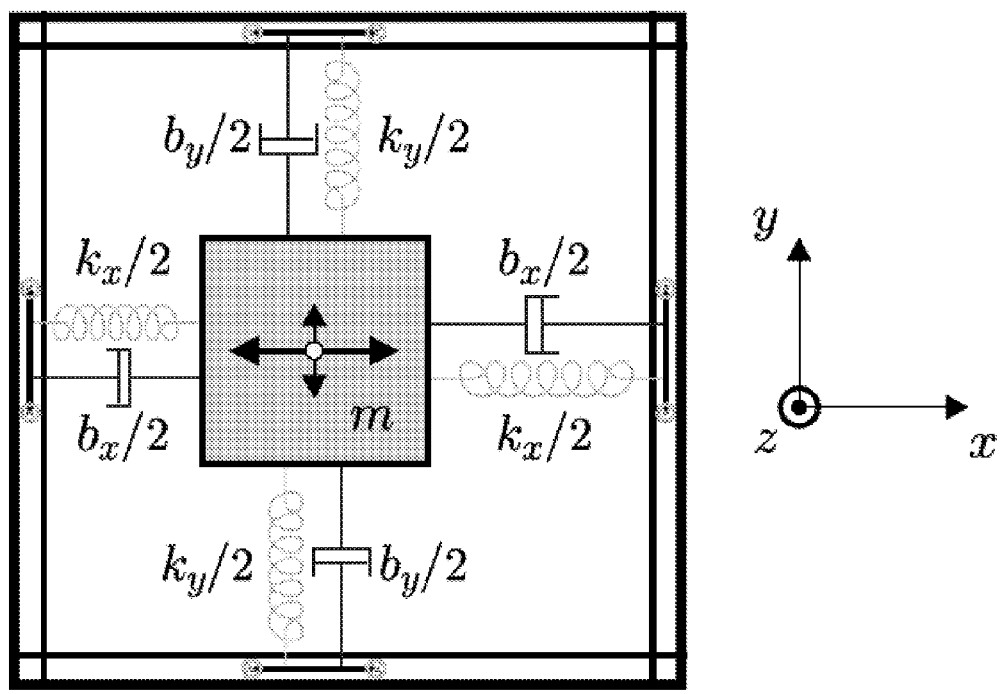
FIG. 1 illustrates a schematic of the general principal of the vibratory gyroscope with two perpendicular in-plane vibration modes.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The present closed-loop frequency-modulated output gyroscope is related to work done towards a resonant magnetic microsensor. See, R. Sunier, T. Vancura, Y. Li, K.-U. Kirstein, H. Baltes, O. Brand, "Resonant magnetic field sensor with frequency output," *IEEE J. Microelectromechanical Systems*, vol. 15, pp. 1098-1107, 2006. In the case of the resonant magnetic sensor, a current proportional to the microsensor's deflection is applied to a current coil embedded in the vibrating microstructure. This generates an (out-of-plane) Lorentz force acting on the vibrating microstructure, e.g. a micromachined cantilever beam, which is proportional to the magnetic induction B and the deflection x of the cantilever. This way, the magnetic force acts as an additional spring force and changes the resonance frequency of the resonator.

A sensitivity of 60 kHz/T (for a resonator with a base frequency of 180 kHz) and a resolution of approximately 1 μT has been achieved. By simply controlling the coil current, the magnetic force can be switched on and off, yielding an efficient offset compensation mechanism. The same basic principle is applied to the present vibratory gyroscope, yielding a micromachined rotation rate sensor utilizing a frequency measurement.

The working principle of the present invention is briefly explained, wherein a gyroscope structure (see FIG. 1) is provided with two perpendicular vibration modes with matched resonance frequencies ($f_x = f_y = f$). A mass m is suspended from a frame by means of springs, thus the mass possesses two degrees of freedom along the x and y directions. The system may be considered as an assembly of two resonators having eigenfrequencies or natural frequencies $f_x$ along x and $f_y$ along y. The mass m is excited at its natural frequency $f_x$ along the x axis.

A drive oscillation is applied in x direction. When a speed of rotation $\Omega$ about the third, z axis, is present, the Coriolis forces induce coupling between the two resonators, causing the mass to vibrate along the y axis. The amplitude of the movement along y is then proportional to the speed of rotation $\Omega$. This amplitude is also a function of the difference in the natural frequencies $f_x$ and $f_y$, and maximum sensitivity is achieved when the two natural frequencies are equal.

For a high-performance gyroscope, it is necessary to obtain maximum sensitivity of the displacement relative to the speed of rotation. It is therefore very desirable to make these frequencies equal.

However, when the frequency equality condition is met, the bandwidth of the gyroscope becomes small. To increase it, the detection movement along y can be feedback controlled by applying an electrostatic or electromagnetic force along the y axis to the mass, which force counterbalances the force created by the Coriolis coupling. There is no longer vibration of the mass along y, and it is then the feedback force proportional to the speed of rotation $\Omega$ that is measured.

It is therefore desirable in vibrating gyroscopes of higher performance for the movement along the y axis to be feedback controlled and for the frequencies $f_x$ and $f_y$ to be made coincident.

In the present invention's driving scheme (see FIG. 2), the driving and the sensing mode are each operated in a closed-loop configuration with constant amplitude at their respective resonance frequencies. Moreover, a controller maintains a 90° phase shift between sense and drive mode vibration and adjusts the resonance frequency of the drive mode to that of the sense mode.

Operated in the closed-loop configuration, the driving force compensates for the oscillator damping, maintaining a constant vibration amplitude of the resonator. To a first order, the equation of motion for the drive mode can thus be approximated by that of a simple mass-spring system $$m\ddot{x} + k_x x = 0 \tag{1}$$

with mass m, spring constant $k_x$ and deflection x. The solution of this equation is a harmonic oscillation $$x(t) = X_0 \tag{2}$$

with amplitude $X_0$ (determined by the closed-loop control) and resonance frequency $$\omega_0 = 2\pi f = \sqrt{\frac{k_x}{m}} \tag{3}$$

In the presence of a rotation rate $\Omega$ (perpendicular to both vibration axes), a Coriolis force $F_{coriolis}$ is acting on the resonator mass $$F_{coriolis} = 2m(v \times \Omega) = 2m(i\omega_0 X_0 e^{i\omega_0 t} \times \Omega) = i2m\omega_0 \Omega x \tag{4}$$

Because both vibration modes are driven with a 90° phase shift and a pre-set amplitude ratio $X_0/Y_0$ (i.e. $x = i(X_0/Y_0)y$), the Coriolis force acting on the sense resonator is proportional to its deflection y, i.e. it acts like an additional spring force.

The resulting simplified one-dimensional equation of motion for the sense mode (again assuming that the driving force of the feedback-circuit cancels the damping force, resulting in an oscillation with constant amplitude $Y_0$) is $$m\ddot{y} + k_y y + F_{coriolis} = m\ddot{y} + k_y y + 2m\omega_0 \Omega \frac{X_0}{Y_0} y \qquad (5)$$

$$= m\ddot{y} + \underbrace{\left[k_y + 2m\omega_0 \Omega \frac{X_0}{Y_0}\right]}_{=k_{eff}} y$$

$$= 0$$

The Coriolis force, thus, modifies the resonance frequency of the sense mode:

$$\omega_m = 2\pi f_m \qquad (6)$$

$$= \sqrt{\frac{k_{eff}}{m}}$$

$$= \sqrt{\frac{k_y + 2m\omega_0 \Omega \frac{X_0}{Y_0}}{m}}$$

$$= \omega_0 \sqrt{1 + 2\frac{\Omega}{\omega_0}\frac{X_0}{Y_0}}$$

Assuming, $$\frac{\Omega}{\omega_0}\frac{X_0}{Y_0} \ll 1,$$

the square root behavior can be linearized, yielding $$\omega_m \approx \omega_0 \left(1 + \frac{\Omega}{\omega_0}\frac{X_0}{Y_0}\right) \qquad (7)$$

or the relative frequency change $$\frac{\Delta\omega_0}{\omega_0} = \frac{\omega_m - \omega_0}{\omega_0} \approx \frac{X_0}{Y_0}\frac{\Omega}{\omega_0} \qquad (8)$$

The resulting (dimensionless) scale factor S of the frequency-output gyroscope is simply the ratio of the drive and sense vibration amplitude $$S = \frac{\Delta\omega}{\Omega} \approx \frac{X_0}{Y_0} \qquad (9)$$

and can, thus, be adjusted via the feedback circuits for the drive and sense modes. This active control of S can be used to increase the dynamic range of the gyroscope without increasing the intrinsic non-linearity implied by Eqn. (6).

Assuming a ratio of the vibration amplitudes $X_0/Y_0 = 10^3$, a rotation rate of 1 deg/s yields a shift of the resonance frequency of $\Delta f \approx 2.8$ Hz. With a typical resonance frequency f=10 kHz of resonators used in gyroscopes, the relative frequency change would be $\Delta f/f = 2.8 \times 10^{-4}$.

Drive Mode Frequency Controlled Gyroscope

Figure 2:
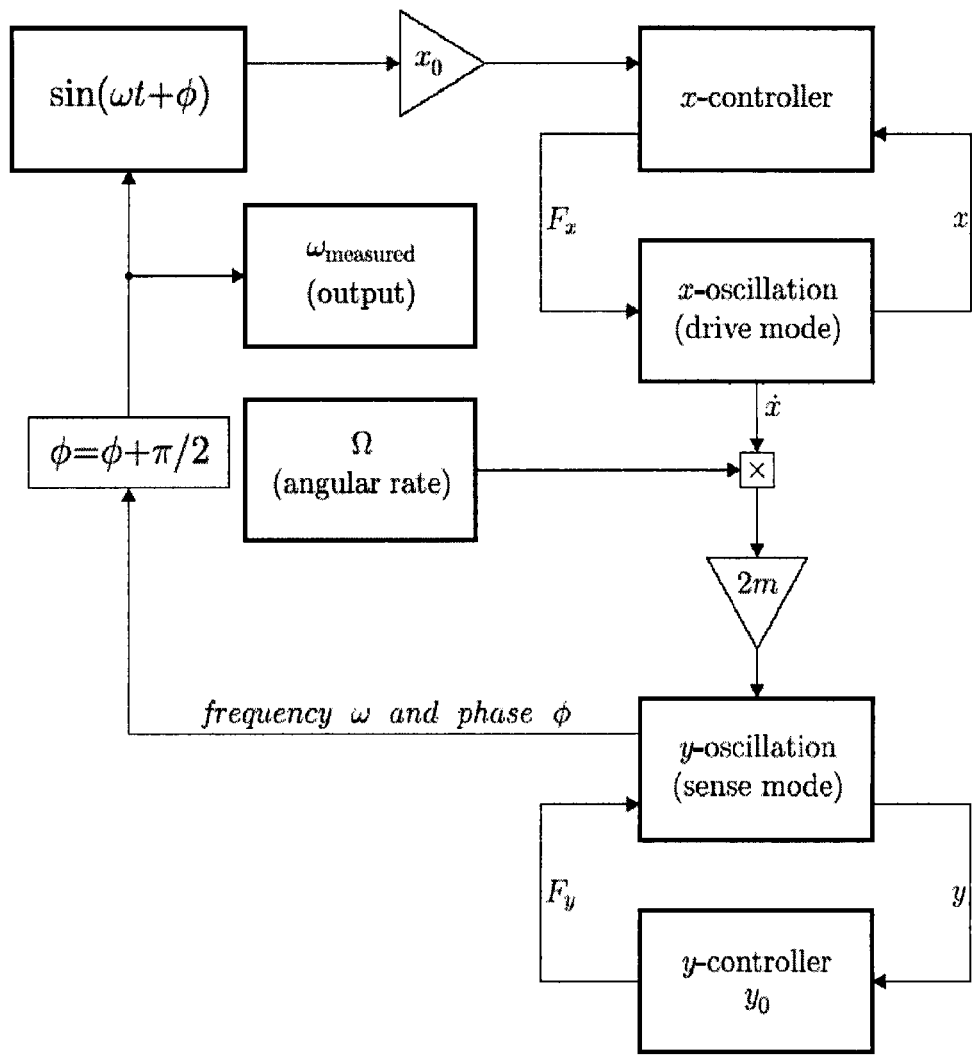
FIG. 2 illustrates the working principle of the present invention according to an exemplary embodiment, wherein a frequency-modulated output gyroscope is provided with a drive mode controller, a sense mode controller, a 90° phase shift between drive and sense mode vibration, and Coriolis coupling that affects the resonance frequency of the sense mode. In this particular embodiment the drive mode frequency follows the sense mode frequency.

The working principle of the present drive mode frequency gyroscope is depicted in FIG. 2. The drive mode and the sense mode are coupled via the Coriolis force induced by the angular rate input signal. The sense mode is driven by a controller (y-controller) using a sense mode signal that holds a stable amplitude $Y_0$, but follows the resonant frequency of the oscillator, i.e. it continuously detects the resonant frequency.

The drive mode is driven by a controller (x-controller) using a drive mode signal that holds a constant amplitude $X_0$, but follows the frequency of the sense mode controller with a constant phase shift of $\pi/2$. The output signal is the resonant frequency as measured by the sense mode controller.

This approach suffers from the fact that the drive mode must be driven with a maximized amplitude in order to yield a reasonable high Coriolis coupling. This circumstance is limiting the range of adjustment of the drive mode. In order to achieve a large range of frequency adjustment the adjusting force must exceed the driving force, and for the design of this project (and probably most gyroscopes) one already exploits the full range of available forces for the driving. Another structure with a tunable drive mode may provide a better basis for such a device.

Sense Mode Frequency Controlled Gyroscope

A solution for the problem of tuning the drive mode over a large frequency range is simply not to do it. Theoretically it is possible to adjust the resonant frequency of the sense mode, thus implementing a "Sense Mode Frequency Controlled Gyroscope".

Figure 3:
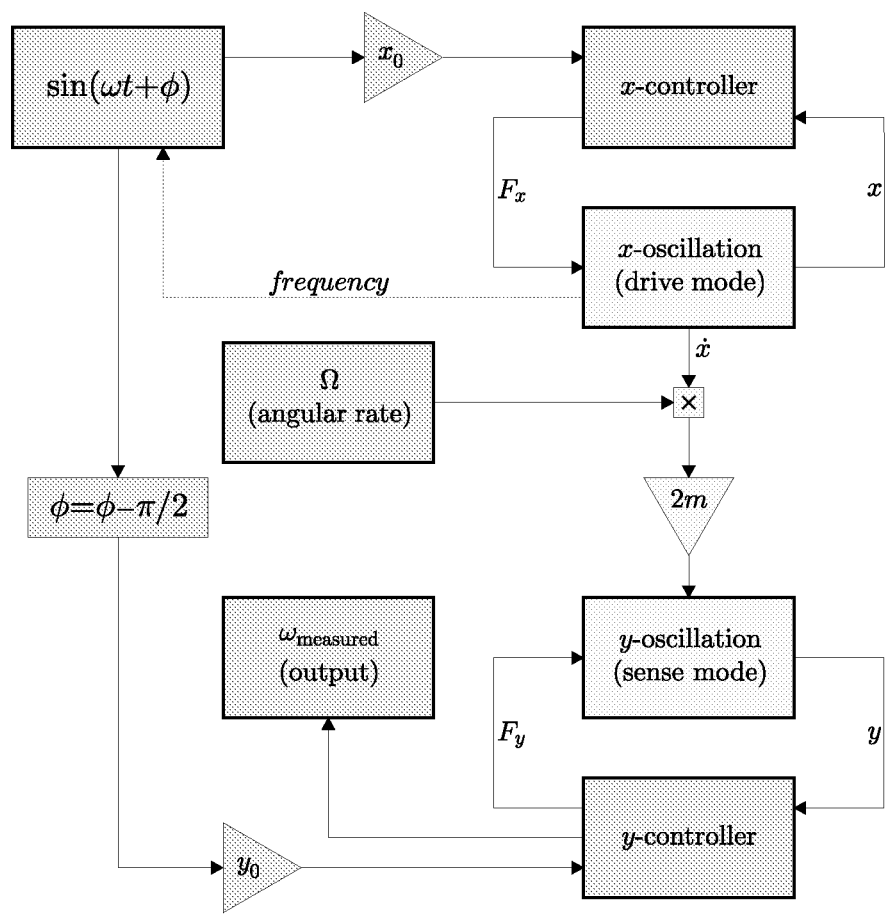
FIG. 3 illustrates the working principle of the present invention according to another embodiment, wherein a frequency-modulated output gyroscope is provided with a drive mode controller, a sense mode controller, a 90° phase shift between drive and sense mode vibration, and Coriolis coupling that affects the resonance frequency of the sense mode. In this particular embodiment the sense mode frequency is adjusted.

The working principle of this type of gyroscope is depicted in FIG. 3. A normalized target oscillation $\sin(\omega t+\phi)$ is generated. Its frequency w is either fixed and chosen to be as close to the resonant frequencies of both modes as possible, or it is a measurement of the resonant frequency of one or both modes that has been fed back to the generator of the target oscillation (indicated for the drive mode by the dotted line named "frequency").

That target oscillation is multiplied by the desired drive mode amplitude $X_0$ and fed to the drive mode controller (x-controller) Likewise the target oscillation is phase shifted by $\pi/2$, multiplied with the desired sense mode amplitude $Y_0$, and fed to the sense mode controller (y-controller). Both controllers compare their input signals with the actual deflection of their oscillators and drive them such that the difference between the input signal and the actual oscillation becomes zero. In other words, the controllers make the oscillators follow the target oscillation with individual amplitudes, a constant phase shift, and identical frequency.

The difference to the Drive Mode Frequency Controlled Gyroscope is that both oscillators are driven with a fixed amplitude ($X_0$ and $Y_0$), a fixed frequency (the common resonant frequency of both modes), and a fixed phase shift ($\pi/2$). This needs to be done by fast and accurate control systems. This can be achieved by a simple PD-controller.

What happens when a disturbance from outside is acting on one of the oscillations is that the controller will have to counteract for this disturbance. The same happens for an angular rate inducing a Coriolis force on the sense mode. As for this case we can view the angular rate as a disturbance of the system: The sense mode will suddenly have a different resonant frequency because of the Coriolis force that is in phase with its deflection acting as an artificial spring constant. The sense mode will start oscillating slightly faster or slower, inducing a difference to the target oscillation. The sense mode controller will have to compensate for it. Thus, the resulting sense mode signal (depending on the accuracy of the controller) will be nothing else than the inverse of the Coriolis force:

The output of the sense mode controller, the sense mode signal, is a direct measurement of the Coriolis force.

Angle Random Walk

Gyroscopes with navigation-grade performance require an angle random walk (ARW) better than $0.001$ deg/(hr)$^{1/2}$=$0.06$ deg/hr/(Hz$^{1/2}$). The ARW of the present invention is limited by the short-term frequency stability of the micromachined (sense) resonator, specified as the standard deviation of the fractional frequency fluctuations for a specific averaging time (measured using the Allan variance method). Typical values of the Allan variance for silicon-based resonators are 1 to 5 $10^{-8}$ for 1 sec averaging time.

With the above example (f=10 kHz, $X_0/Y_0=10^3$) and using Eqn. (8), an Allan variance of $10^{-8}$ would result in an ARW of 0.1 deg/hr (noting that this requires an averaging time of 1 sec, i.e. a bandwidth of 1 Hz).

$$ARW = \Omega_{min} = \left(\frac{\Delta\omega}{\omega_0}\right)_{min} \omega_0 \frac{Y_0}{X_0} \qquad (10)$$

Temperature stabilization enables further improvement of the short-term frequency stability. As a reference, oven-controlled crystal oscillators (OCXO) used as timing standards achieve 1-sec Allen variances better than $10^{-12}$.

Bias Stability

Gyroscopes with navigation-grade performance require a bias drift stability better than 0.01 deg/hr. In the present frequency-output gyroscope, the bias drift stability is related to the long-term drift of the base resonance frequency, i.e. the resonance frequency of the sense mode with zero applied rotation rate.

With an amplitude ratio of $X_0/Y_0=10^3$, the required stability translates into a resonance frequency drift of approximately 8 µHz/hr, or a frequency stability better than $10^{-9}$/hr for a 10 kHz resonator. For comparison, oven-controlled crystal oscillators (f=5-10 MHz) achieve long-term frequency stabilities of $<10^{-10}$/day.

While a timing reference requires an absolute frequency stability, the present rotation rate sensor can tolerate a base frequency drift, if this base frequency can be measured in periodic intervals. The present sensing concept for vibratory gyroscopes provides such an intrinsic offset cancellation by disabling the Coriolis force acting on the sense vibration: without drive mode oscillation, no Coriolis force is generated and the sense vibration locks to the base frequency.

Figure 4:
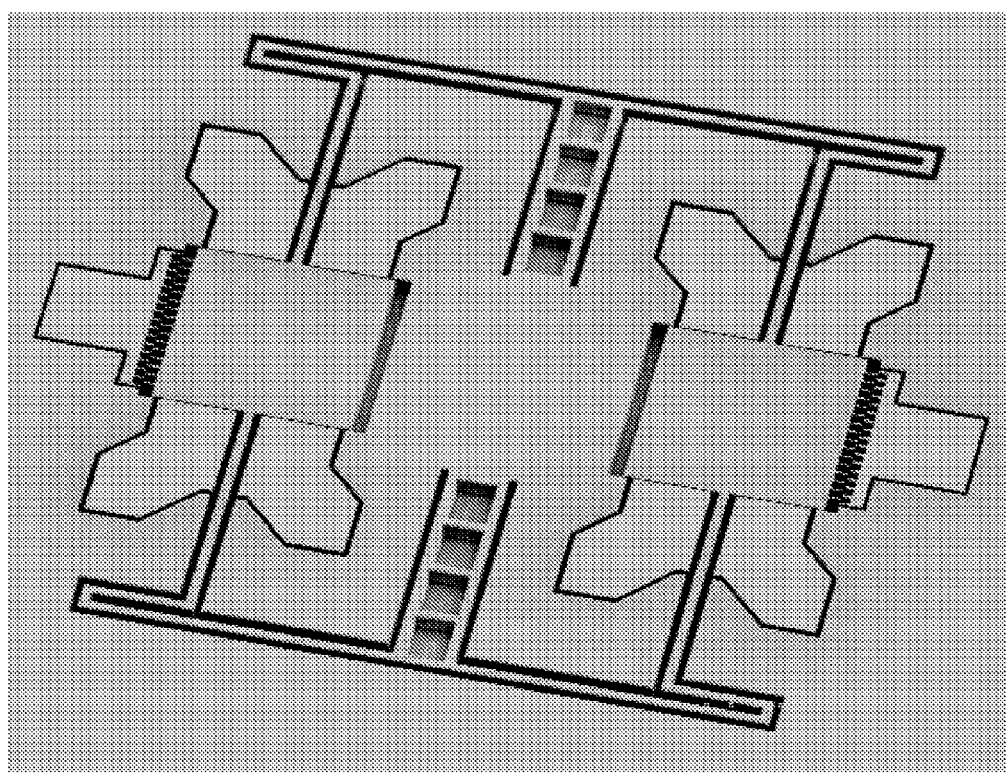
FIG. 4 illustrates a matched-mode silicon tuning fork gyroscope.

The present invention was prototyped, and in order to minimize initial design and fabrication efforts, leveraged on existing amplitude-output vibratory gyroscopes. In particular, electrostatic frequency-matched designs with frequency-tunable drive and sense modes (see e.g. FIG. 4) were used to verify the feasibility of the present frequency-output gyroscope.

Figure 5:
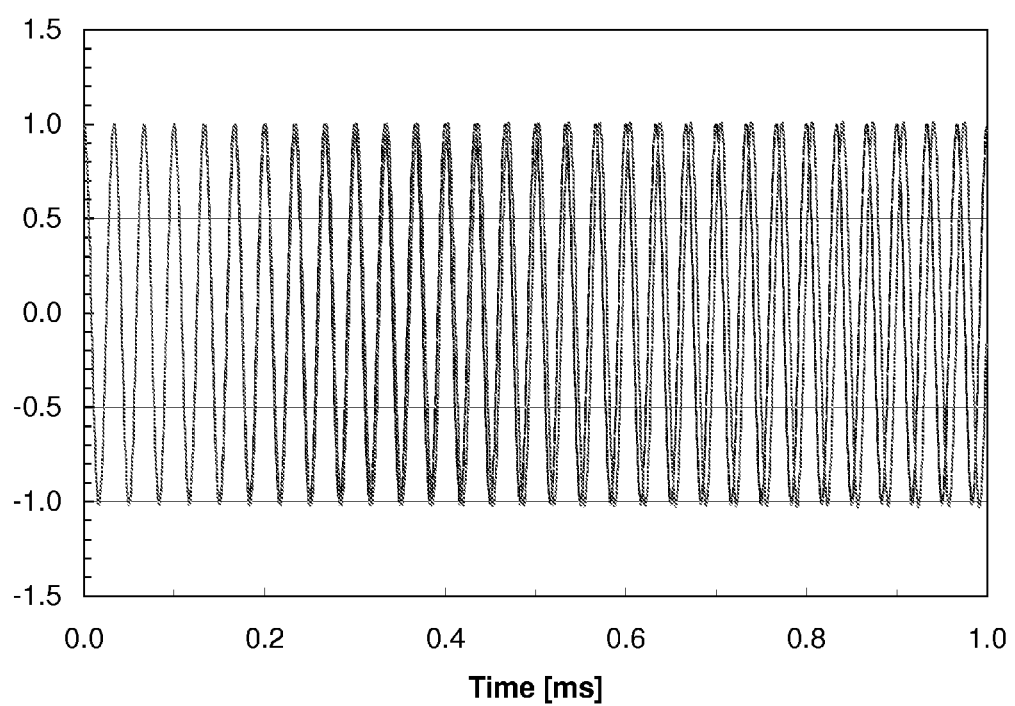
FIG. 5 illustrates the sense mode deflection as a function of time as simulated with SIMULINK ($X_0/Y_0=1000$); blue line: no rotation rate applied; red line: rotation rate of 100°/s applied after 0.1 ms; sense and drive mode have both an undistorted resonance frequency of 30 kHz; as expected from the analytical model, the applied rotation rate results in a frequency shift $\Delta f \approx 300$ Hz.

A prototype of the present frequency-output gyroscope was verified by first SIMULINK simulations (see FIG. 5). Here, the drive mode is controlled to follow the sense mode frequency with constant amplitude and phase difference. The sense mode is implemented as a lossless harmonic oscillator, such that it oscillates freely without the need of compensating for decreasing amplitude.

The phase and amplitude tracking is simulated by a simple integration followed by a normalization of the amplitude, i.e. the (phase shifted) oscillation of the sense mode as a target signal for the drive mode was used. This signal is fed to the drive mode controller, implemented as a simple PD-controller. Note that in this simplified simulation the drive mode controller can have extremely high driving forces. Instead, one could add a saturation block to simulate of a more realistic controller. It should further be noted that the application of an angular rate is immediately seen in the sense mode resonance frequency. The response time to signal transients is important for many applications and a challenge in amplitude-output gyroscopes with high Q-factors. Predictions of the transient response time based on the simplified SIMULINK model are difficult and the results must be verified carefully by suitable experiments.

The present invention provides numerous advantages over conventional gyroscopes.

1. Frequency Output: Frequencies are generally easier to measure compared to amplitudes, which typically require high-performance analog-to-digital converters. The minimal detectable frequency change is limited by the short-term frequency stability and the length of the counting period.

2. Adjustable Sensitivity: The sensor sensitivity is proportional to the ratio of the drive and sense mode amplitude, which are controlled by the closed-loop oscillation circuits for both modes. This way the dynamic range of the gyroscope can be adjusted by selecting proper amplitude ratios.

3. Automatic Offset Cancellation: The present sensing concept for vibratory gyroscopes allows an intrinsic offset cancellation by disabling the Coriolis force acting on the sense vibration—without drive mode oscillation, no Coriolis force is generated and the sense vibration locks to the base frequency. This way sensor drift can be automatically removed by a simple differential measurement.

4. Phase detection: The electronics used to control the drive and the sense mode are no longer dependant on a extremely accurate measurement of the sense mode amplitude, the two amplitudes just have to be held stable. One could even imagine a tuning of one of the amplitudes in order to set the desired resolution just by redefining the amplitude ratio. A critical parameter is the phase difference between the two modes. A change in the resonant frequency of the sense mode is first detected by a slight phase shift between the two oscillations.

5. Response: The response of traditional gyroscopes to a rotation is relatively slow because of the time constant $\tau$ that is proportional to the quality factor. The response of a frequency based gyroscope does not depend on such a time constant. The resonant frequency is instantly changed, and it is only a matter of how fast the electronics can detect and adapt to the new resonant frequency that determines how fast the device can detect a rotation rate. Theoretically the new resonant frequency is detectable after one oscillation, thus the "time constant" of the frequency based gyroscope is in the order of $1/\omega_r$ and thus roughly Q times faster.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

We claim:

1. A method of detecting rotation rate from changes in frequency comprising:

suspending a mass movable along or around one or more axes;

vibrating the mass along or around a first of the one or more axes at an initial sense mode frequency by a sense mode signal;

vibrating the mass along a second of the one or more axes at an initial drive mode frequency by a drive mode signal;

obtaining a change in the sense mode frequency from its initial sense mode frequency upon rotation of the mass about an axis that does not coincide with the first of the one or more axes;

wherein the change of frequency of the sense mode signal from the initial sense mode frequency is indicative of a rotation rate of the mass.

2. The method of claim 1, wherein the initial sense mode frequency is the resonant frequency of the mass along or around the first of the one or more axes.

3. The method of claim 1, wherein the rotation rate of the mass generates a force acting on the mass that has a component that is proportional to an amount of deflection along the first of the one or more axes.

4. The method of claim 1, wherein the initial drive mode frequency is approximately equal to the initial sense mode frequency.

5. The method of claim 1, wherein the initial sense mode frequency is the resonant frequency of the mass along or around the first of the one or more axes, and wherein the initial drive mode frequency is the resonant frequency of the mass along or around the second of the one or more axes.

6. The method of claim 1, wherein the first of the one or more axes and the second of the one or more axes are perpendicular to each other.

7. The method of claim 6, wherein the mass is rotated around an axis perpendicular to the drive mode axis and perpendicular to the first of the one or more axes and the second of the one or more axes.

8. A rotation rate sensor comprising:
at least one mass with two perpendicular vibration modes, capable of vibrating along an x axis at a resonant frequency $f_x$, and capable of vibrating along a y axis at a resonant frequency $f_y$,
a first driving mechanism that imparts a sense mode vibration having frequency, amplitude, and phase to the mass along a sense mode axis, being one of the x or y axes;
a second driving mechanism that imparts a drive mode vibration having frequency, amplitude, and phase to the mass along a drive mode axis, being the axis perpendicular to the sense mode axis;
a first feedback circuit for monitoring the sense mode vibration and making adjustments to the first driving mechanism; and
an output signal having a default frequency;
wherein upon rotation of the mass about an axis orthogonal to the x and y axes, the variation in the output signal from the default frequency is indicative of a rotation rate of the mass.

9. The rotation rate sensor of claim 8, further comprising a second feedback circuit for monitoring the drive mode vibration and making adjustments to the second driving mechanism.

10. The rotation rate sensor of claim 9, wherein the frequency of the drive mode vibration and the frequency of the sense mode vibration are approximately equal.

11. The rotation rate sensor of claim 9, wherein the phase of the vibration along the drive mode axis and the phase of the vibration along the sense mode axis are shifted approximately 90 degrees from one another.

12. The rotation rate sensor of claim 9, wherein the first and second driving mechanisms are each operated in a closed-loop configuration with constant amplitude at their respective resonance frequencies.

13. The rotation rate sensor of claim 9, wherein a constant ratio is maintained between the amplitude of vibration along the sense mode axis and the amplitude of vibration along the drive mode axis.

14. The rotation rate sensor of claim 9, wherein the amplitude of the frequency-modulated output signal maintains a constant level.

15. A method of detecting rate of rotation from changes in frequency comprising:
vibrating a mass along or around a first axis at an initial drive mode frequency by applying a force to the mass;
vibrating a mass along or around a second axis at an initial sense mode frequency by applying a force to the mass;
applying an additional force to the mass to restore the initial sense mode frequency of vibration to the mass; and
measuring the additional force needed to restore the initial frequency of vibration.

* * * * *